United States Patent [19]
Ramun

[11] Patent Number: 5,926,958
[45] Date of Patent: Jul. 27, 1999

[54] METAL CUTTING SHEAR AND PIERCING TIP THEREFOR

[75] Inventor: John R. Ramun, Poland Township, Ohio

[73] Assignee: Allied Gator, Inc., Youngstown, Ohio

[21] Appl. No.: 08/943,660

[22] Filed: Oct. 3, 1997

[51] Int. Cl.⁶ ..................................................... B23P 19/00
[52] U.S. Cl. ............................................... 30/134; 30/228
[58] Field of Search ........................... 30/134, 228, 349; 144/34.5

[56] References Cited

U.S. PATENT DOCUMENTS

| | | | |
|---|---|---|---|
| 4,198,747 | 4/1980 | LaBounty | 30/134 |
| 4,403,431 | 9/1983 | Ramun et al. | 37/117.5 |
| 4,450,625 | 5/1984 | Ramun et al. | 30/134 |
| 4,519,135 | 5/1985 | LaBounty | 30/134 |
| 4,543,719 | 10/1985 | Pardoe | 30/134 |
| 4,616,417 | 10/1986 | Gross | 30/134 |
| 4,670,983 | 6/1987 | Ramun et al. | 30/134 |
| 4,686,767 | 8/1987 | Ramun et al. | 30/134 |
| 4,719,975 | 1/1988 | LaBounty | 173/46 |
| 4,776,093 | 10/1988 | Gross | 30/134 |
| 4,897,921 | 2/1990 | Ramun | 30/134 |
| 5,187,868 | 2/1993 | Hall | 30/134 |
| 5,619,881 | 4/1997 | Morikawa et al. | 72/330 |

*Primary Examiner*—Hwei-Siu Payer
*Attorney, Agent, or Firm*—Webb Ziesenheim Logsdon Orkin & Hanson, P.C.

[57] ABSTRACT

A heavy-duty shear adapted to be attached to a backhoe includes a fixed blade member with at least one blade insert attached to the fixed blade member. A movable blade is pivotally attached to the fixed blade with at least one blade insert attached to the movable blade. A piercing tip is attached to a front end of the movable blade with the blade inserts positioned between the piercing tip and the pivot point. The piercing tip extends to blade inserts of the moveable blades. The piercing tip may include a front end having a projection on a lower side thereof along a centerline of the piercing tip. The piercing tip of the present invention is designed to more easily sever material to be cut by the shear with the primary cut of the piercing tip being substantially perpendicular to the cut achieved by the blade inserts of the shear.

20 Claims, 6 Drawing Sheets

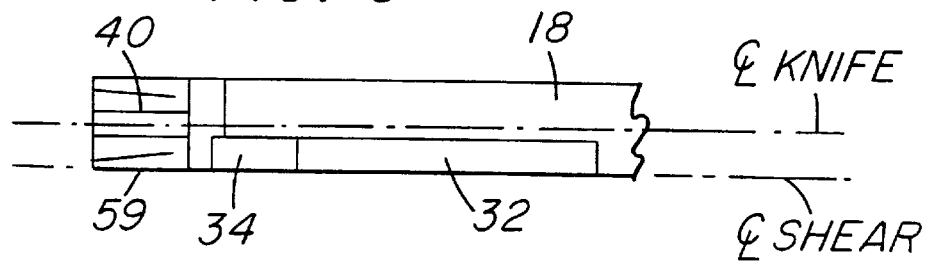
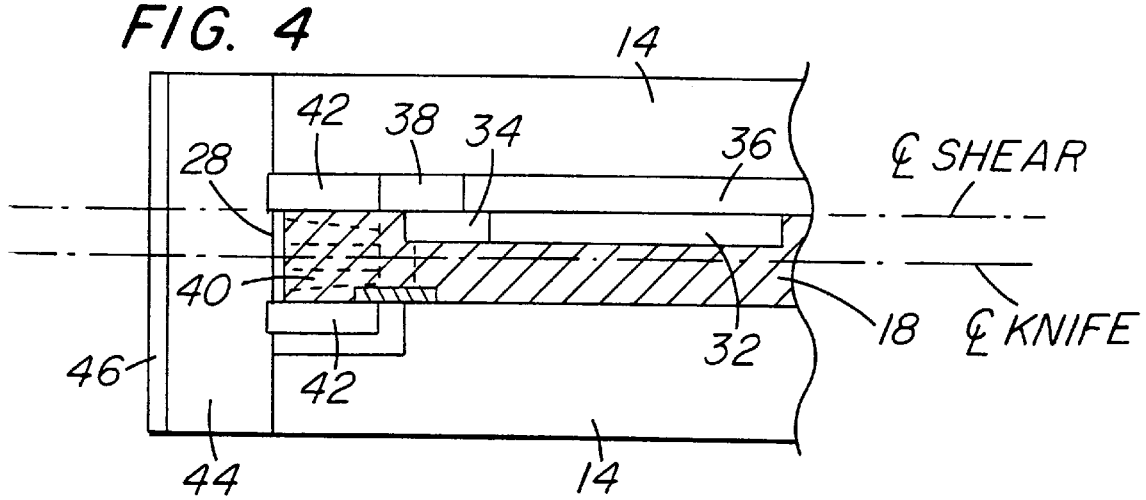
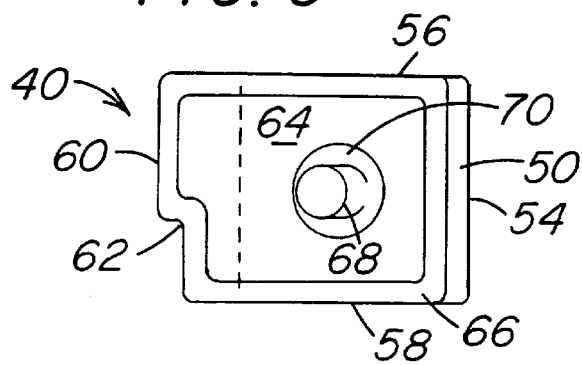
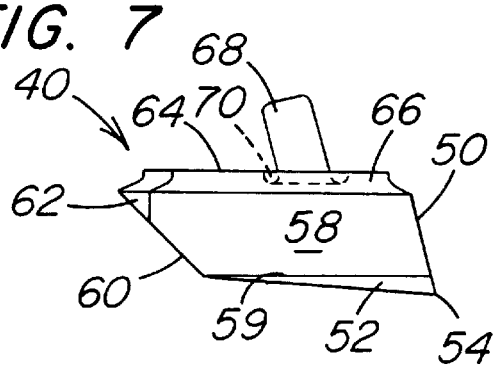
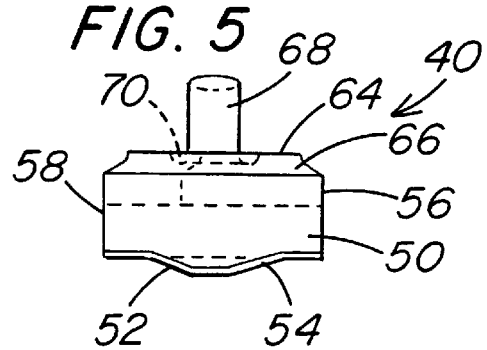

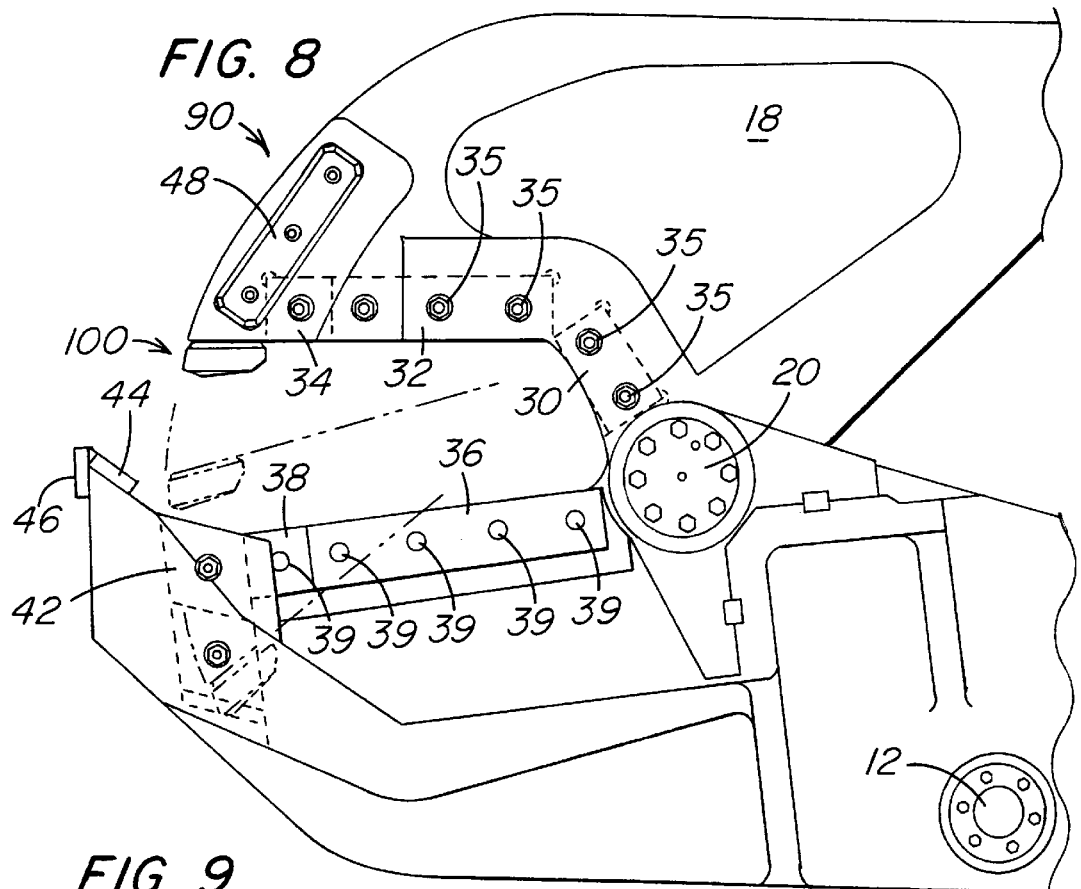
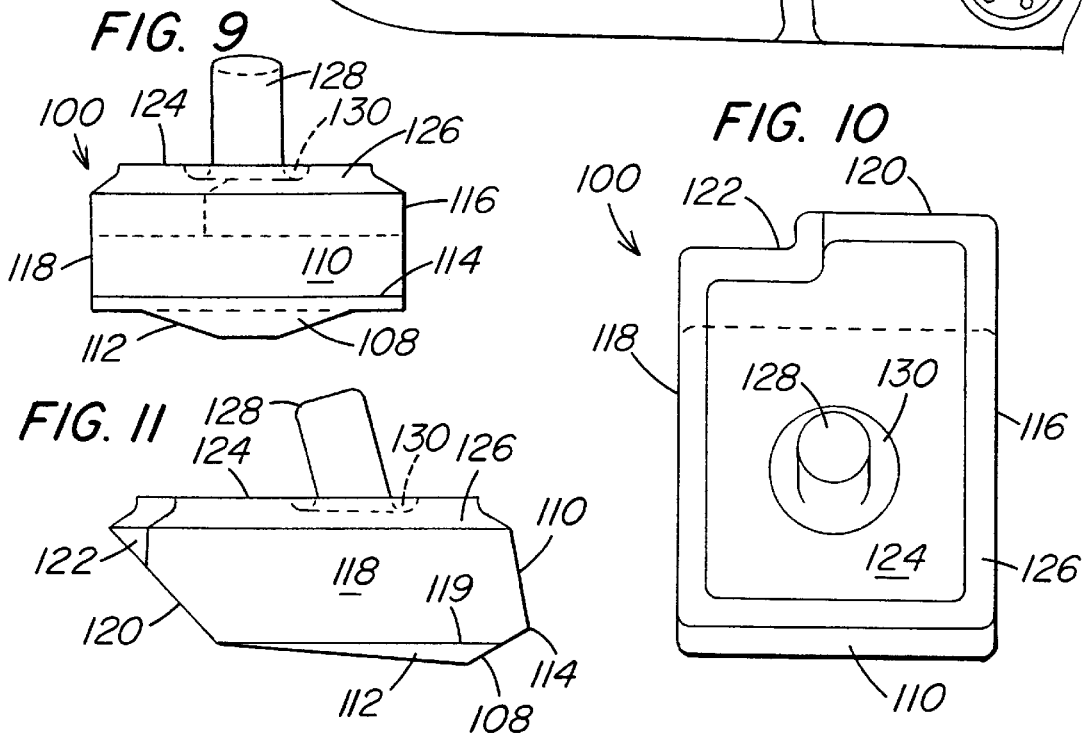

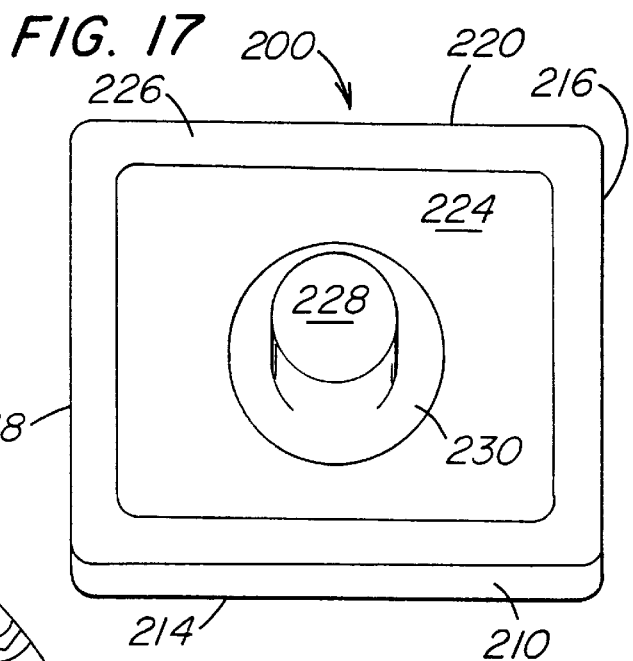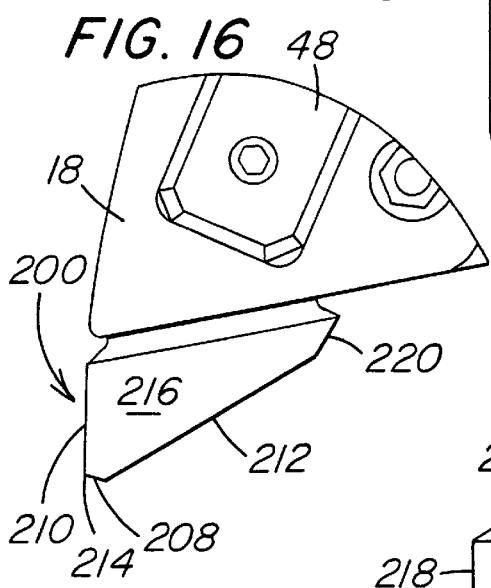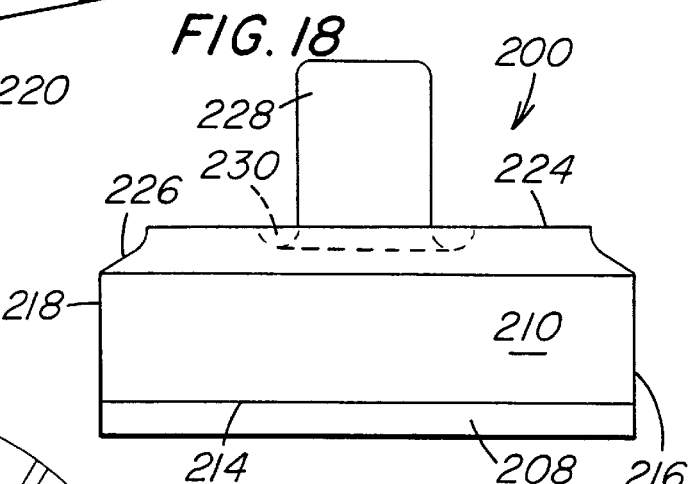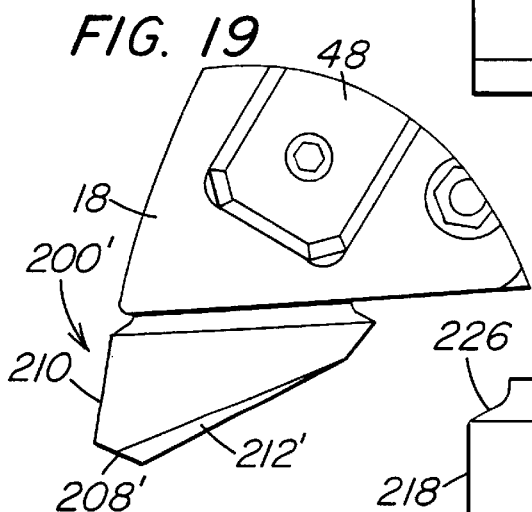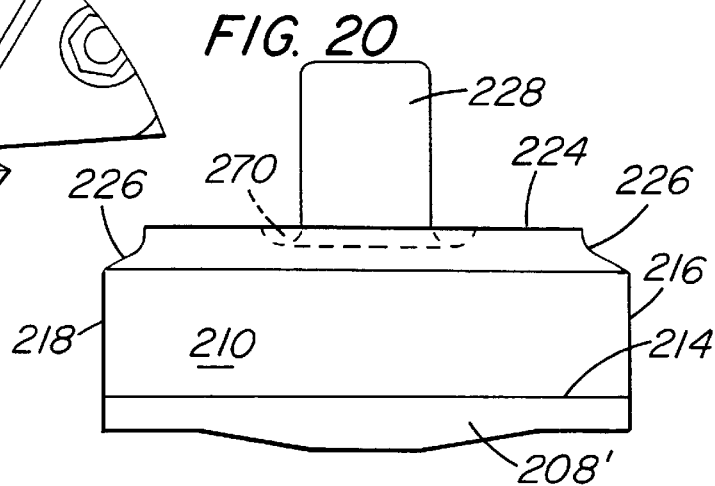

5,926,958

METAL CUTTING SHEAR AND PIERCING TIP THEREFOR

BACKGROUND OF THE INVENTION

1. Field of the Invention

The present invention relates to a heavy-duty shear which is adapted to be attached to a backhoe and, more particularly, the present invention relates to a piercing tip for a heavy-duty shear.

2. Prior Art

Heavy-duty shears are mounted on backhoes and powered by hydraulic cylinders for the efficient handling and shearing of scrap, generally metal scrap. The scrap is sheared into usable sizes. For example, in dismantling an industrial building, metal scrap in the form of pipes of various diameters and lengths, structural beams, such as I-beams, channels, angles and the like, sheet metal and sheet plates must all be efficiently handled and severed by the shears. Shears are additionally utilized for reducing automobile and truck frames, railroad cars and the like. The shears must be able to move and cut the metal scrap pieces regardless of the size or shape of the individual scrap piece and without any significant wedging or biting action of the workpieces relative to the shears, or other damage to the shears.

U.S. Pat. No. 4,198,747 generally discloses a hydraulic shear for a backhoe. FIGS. 4 and 5 illustrate the typical operation for a hydraulic shear of this design. The hydraulic shear does not include hardened inserts along the moveable jaw, however, cutting inserts are disclosed in many later patents. U.S. Pat. No. 4,519,135 to LaBounty, for example, discloses a metal demolition shear in which the upper jaw 14 includes a shear blade 21 having hardened cutting inserts 24 and 25 defining shear edges 24.1 and 25.1. FIG. 2 of the LaBounty '135 patent illustrates the shearing edges. My prior U.S. Pat. Nos. 4,403,431 and 4,450,625 both disclose material handling and shearing attachment for a backhoe which utilizes a hook-shaped cutting blade. The hook-shaped cutting blade is used to grasp, hold, pull and/or lift beams, pipes, cables and the like to be sheared back to the cutting edges of the shear. U.S. Pat. No. 4,543,719 to Pardoe discloses a shear attachment for a backhoe in which the upper pivotal jaw includes a pair of replaceable cutting blades 22. U.S. Pat. No. 4,719,975 to LaBounty discloses a shear utilized for the demolition of concrete. The shear includes hardened insert bars 72 and 74 in the respective fixed and moveable jaws 50 and 54 to form the cutting edges of the shear. These patents do not include a separate piercing action by a piercing tip or insert. Additionally, these patents do not include a continuous cutting edge along the upper jaw of the moveable blade extending from the end of the jaw to the pivot point. Without a piercing tip, these shears are not efficient at handling metal scrap which extends beyond the length of the jaw.

Some of the prior art shears are adapted to operate on a workpiece which is longer than the jaw length of the shear. When these shears are working on a workpiece which is longer than the jaw length of the shears, the forwardmost portion of the movable blade is used to pierce into the workpiece such that the forward portion of the blade forms a piercing tip. This allows the cutting edge sections behind the piercing tip to more easily sever the remaining portions of the workpiece. The prior art heavy-duty shear designs which incorporate a piercing tip are limited in that they are not designed for the most efficient piercing operation of the workpiece.

U.S. Pat. No. 4,776,093 to Gross discloses metal demolition shears utilizing removable blade inserts. A moveable boot tip 91 surrounds the projecting tip 31 of the upper jaw 19. The boot tip is mounted by countersunk, recessed bolts on one side of the upper jaw and acts as a wear plate during operation. The use of a boot completely surrounding the leading edge of the upper jaw limits the construction of the width of the upper jaw relative to the spacing of the lower jaw. Specifically, the upper jaw must be dimensioned so that the upper jaw together with the surrounding boot tip is sized to fit through the slot in the lower jaw opening. My prior U.S. Pat. Nos. 4,670,983 and 4,897,921 disclose similar heavy-duty shears to the present invention. The metal cutting shears include a moveable plate having a v-shaped cutting configuration with a piercing tip insert at the leading edge of the moveable blade. One drawback of these designs is that the piercing tip does not extend to the remaining blade inserts. This construction can result in undue wear on the jaw face of the moveable blade. The above patents do not provide for the most efficient design of the piercing tip or for a coordination of the design of the piercing tip with the type of scrap product which is primarily to be cut by the shears.

It is an object of the present invention to overcome the aforementioned drawbacks of the prior art. It is another object of the present invention to provide efficient, replaceable piercing tips for a metal cutting shear. It is a further object of the present invention to provide a shear designed to operate effectively in conjunction with a piercing tip.

SUMMARY OF THE INVENTION

The objects of the present invention are achieved by providing a heavy-duty shear which is adapted to be attached to a backhoe. The shear includes a fixed blade member with at least one blade insert attached to the fixed blade member, each blade insert having at least one cutting edge thereon. A movable blade is pivotally attached to the fixed blade with at least one blade insert attached to the movable blade with each blade insert having at least one cutting edge thereon. The cutting edges of the blade inserts on the movable blade cooperate with the cutting edges on the blade inserts of the fixed blade to provide a shearing action. A piercing tip is attached to the moveable blade at a portion spaced from the pivotable attachment of the moveable blade to the fixed blade with the blade inserts therebetween. The piercing tip extends to the blade inserts of the moveable blade.

The piercing tip extends from the forwardmost edge of the moveable blade to the blade inserts of the moveable blade. The piercing tip includes a main cutting edge extending transverse to the cutting edges of the blade inserts and at least one side cutting edge extending in a plane of said cutting edges of said blade inserts whereby a substantially continuous cutting edge is provided from the pivot point of the moveable blade to the cutting edge of the piercing tip. The piercing tip is of the same width as the moveable blade.

The piercing tip may include a front end having a projection on a lower side of the front end on a centerline of the piercing tip. The piercing tip of the present invention may provide a substantially planar front face as part of the front end, with the front face tapering rearwardly from a bottom surface to a top surface thereof. The piercing tip may further include a cutting edge extending across a lower side of the front face. Additionally, the bottom surface of the piercing tip may attach to a rear surface of the piercing tip along a straight line such that at least a middle portion of the bottom surface tapers toward the rear surface from the projection of the front end. The piercing tip of the present invention may additionally include a post member extending from the top surface of the piercing tip forming a mounting member for the piercing tip. The piercing tip of the present invention may be removably attached to the moveable blade of the shear, wherein a plurality of distinct types of piercing tips may be provided, each being selectively attached to the shear. This allows the piercing tip to be selected based upon the type of scrap material which is being cut most often. For example, a sharper angled gathering tip can be used for primarily cutting light gauge products and a more blunt tip can be used for heavier plate type products.

In one embodiment of the present invention, the front cutting edge of the piercing tip may include a pair of spaced, collinear, substantially straight end segments adjacent opposite sides of the front face. The front cutting edge may further include a substantially straight center segment with a pair of transition segments on opposite sides of the center segment, each transition segment extending from the center segment to one of the end segments. The piercing tip of the present invention may additionally include a cutout on the rear surface adjacent the top surface wherein the cutout is adapted to receive one blade insert therein.

These and other advantages of the present invention will be clarified in the description of the preferred embodiments taken together with the attached figures wherein like reference numerals represent like elements throughout.

BRIEF DESCRIPTION OF THE DRAWINGS

FIG. 3 is a plan view of a portion of the upper movable jaw illustrated in FIG. 2 taken along line III—III;

FIG. 4 is a sectional view of a portion of the jaw illustrated in FIG. 2 taken along line IV—IV;

FIG. 5 is a front view of a piercing tip of the shear illustrated in FIGS. 1–4;

FIG. 6 is a top plan view of the piercing tip illustrated in FIG. 5;

FIG. 7 is a side view of the piercing tip illustrated in FIGS. 5 and 6;

FIG. 8 is a side view of a jaw portion of a shear according to a second embodiment of the present invention;

FIG. 9 is a front view of the piercing tip of the shear illustrated in FIG. 8;

FIG. 10 is a top plan view of the piercing tip illustrated in FIG. 9;

FIG. 11 is a side view of the piercing tip illustrated in FIGS. 9 and 10;

FIG. 16 is a side view of a piercing tip on an upper jaw of a shear according to a fourth embodiment of the present invention;

FIG. 17 is an enlarged top plan view of the piercing tip illustrated in FIG. 16; and FIG. 18 is an enlarged front view of the piercing tip illustrated in FIGS. 16 and 17.

FIG. 19 is a side view of a piercing tip on an upper jaw of a shear according to a fifth embodiment of the present invention; and FIG. 20 is an enlarged front view of the piercing tip illustrated in FIG. 19.

DESCRIPTION OF THE PREFERRED EMBODIMENTS

Figure 1:
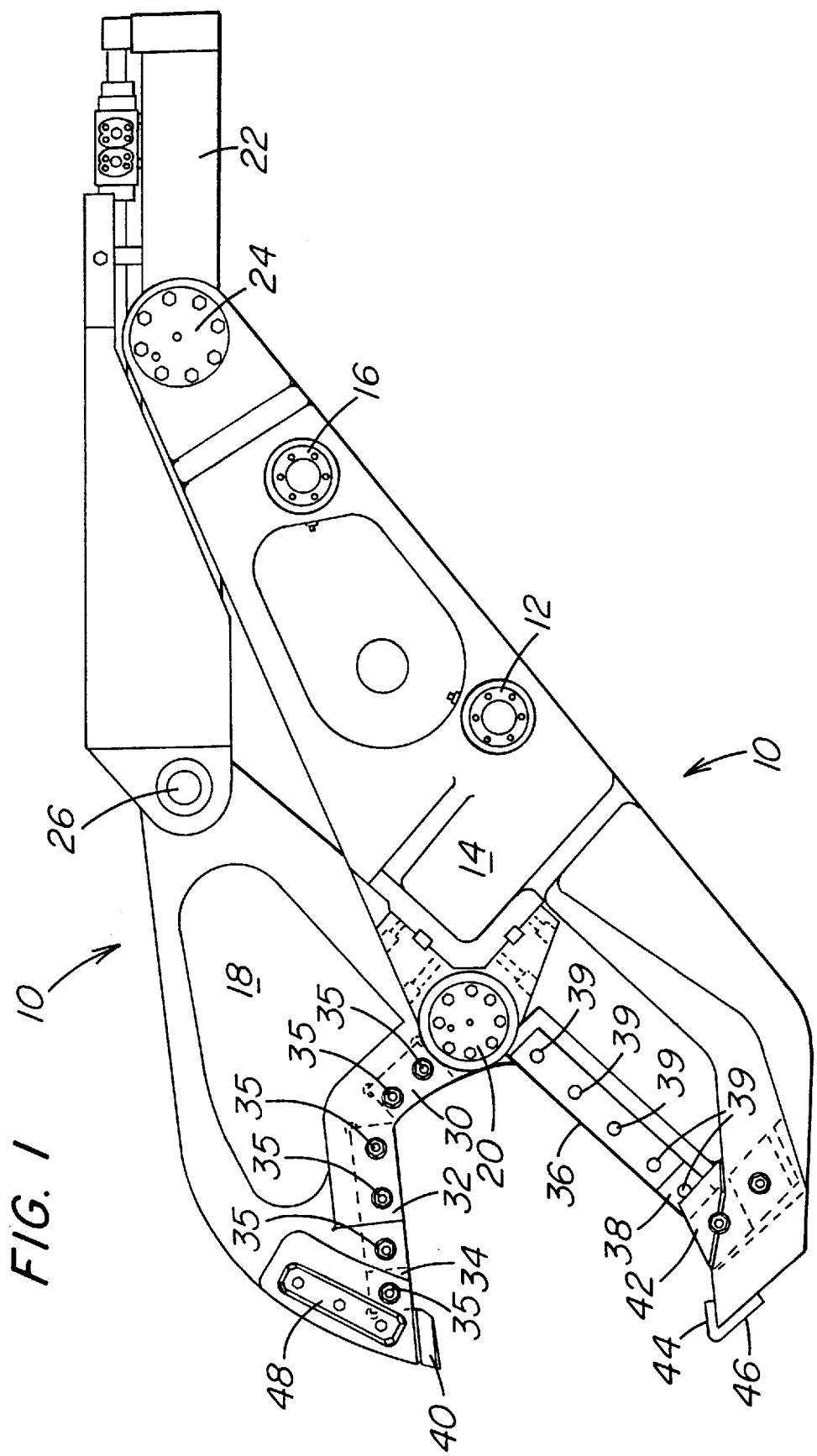
FIG. 1 is a side view of a heavy-duty shear according to a first embodiment of the present invention.

FIG. 1 illustrates a shear 10 according to a first embodiment of the present invention which is adapted to be attached to a backhoe boom or dipstick (not shown) by a mounting pin extending through a bushing 12 on a fixed blade 14 of the shear 10. A second bushing 16 on the fixed blade 14 is adapted to be attached to the piston rod of a piston and cylinder assembly of the backhoe which is pivotally attached to the boom or dipstick. The piston and cylinder assembly attached to the second bushing 16 is adapted to pivot the shear 10 about the bushing 12 relative to the boom or dipstick.

A movable blade 18 is pivotally attached by a thrust bearing arrangement 20 to the fixed blade 14, thereby forming a pair of jaws. A hydraulic cylinder assembly 22 is supported on the fixed blade 14 by bearing assembly 24. The piston rod of the hydraulic cylinder assembly 22 is attached to the movable blade 18 by a pivot pin 26. Operation of the hydraulic cylinder assembly 22 will move the movable blade 18 relative to the fixed blade 14 by pivoting the movable blade 18 about the thrust bearing arrangement 20. The hydraulic cylinder assembly 22 and the piston and cylinder assembly attached to the second bushing 16 are controlled by the backhoe operator in a conventional fashion.

Figure 2:
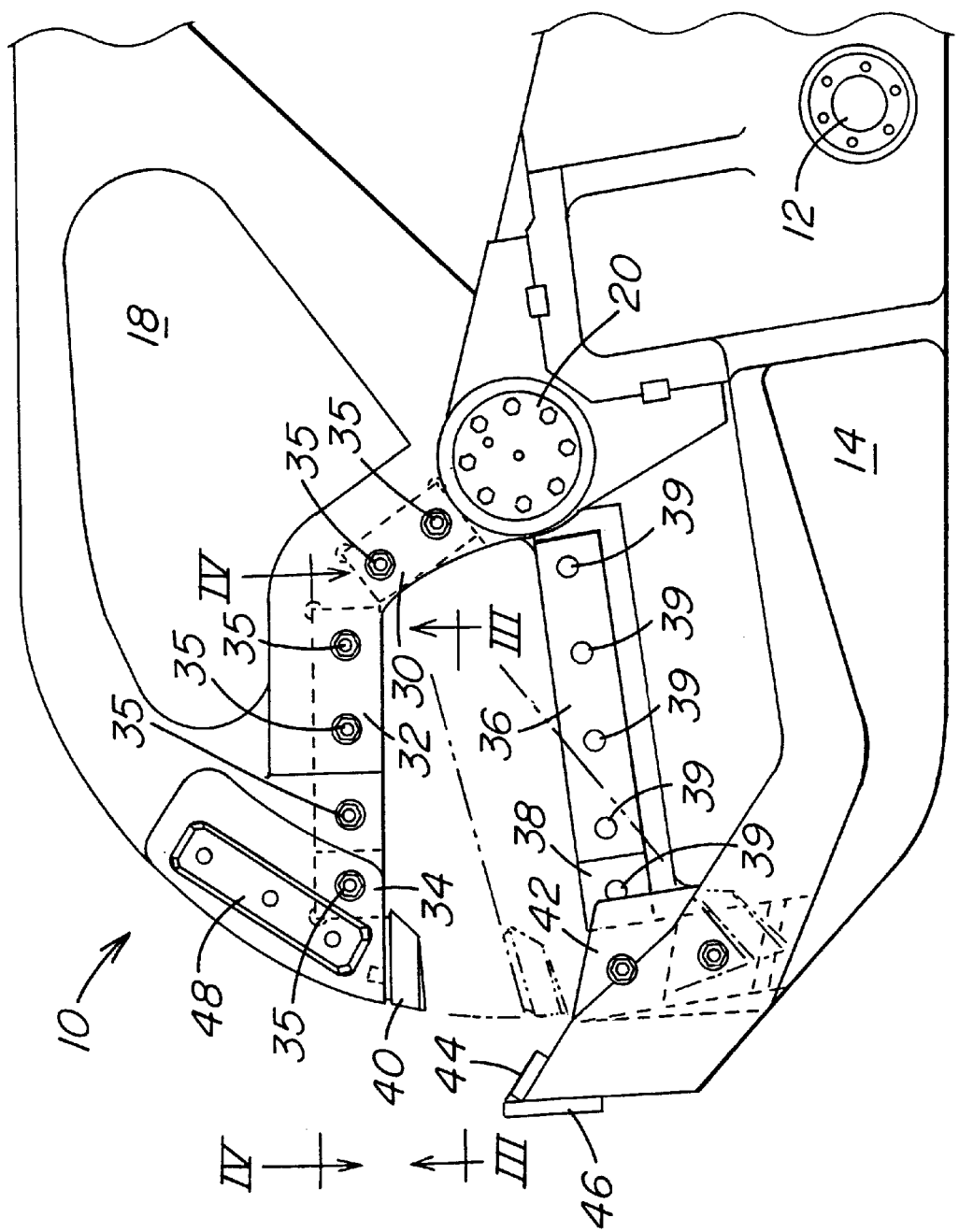
FIG. 2 is an enlarged side view of a jaw portion of the shear illustrated in FIG. 1.

As shown in FIGS. 2 and 4, the fixed blade 14 is preferably formed as a pair of spaced plates having a slot 28 with the movable blade 18 adapted to move through the slot 28 as shown in phantom in FIG. 2.

The movable blade 18 includes three blade inserts 30, 32 and 34 positioned along a side edge or jaw face thereof in a v-shaped arrangement. The length of blade inserts 32 and 34 on one leg of the v-shape is longer than the length of the blade insert 30 along the other length of the v-shape which is adjacent the thrust bearing arrangement 20. The front portion of movable blade 18 is shown in FIG. 3. The blade inserts 30, 32 and 34 are removably attached to the movable blade 18 by mounting bolts 35 extending generally transverse to the blade inserts 30, 32 and 34. Each of the blade inserts 30, 32 and 34 includes at least one and preferably a plurality of cutting edges along the side edges thereof. With a plurality of cutting edges along each blade insert 30, 32 and 34, when the respective cutting edge has dulled, a new cutting edge can be presented by indexing the appropriate blade insert 30, 32 or 34 to present a new cutting edge.

The fixed blade 14 includes a pair of blade inserts 36 and 38 removably attached to the fixed blade 14 adjacent the slot 28. The blade inserts 36 and 38 are removably attached to the fixed blade 14 by bolts 39 extending generally transverse to the blade inserts 36 and 38. The blade inserts 36 and 38 include at least one and preferably a plurality of cutting edges extending along side corner portions thereof. As with blade inserts 30, 32 and 34, providing a plurality of cutting edges on the blade inserts 36 and 38 allows for indexing the blade inserts to present new cutting edges for the fixed blade 14. The cutting edges of the blade inserts 30, 32 and 34 cooperate with the exposed cutting edges of the blade inserts 36 and 38 to provide a shearing action for the shear 10. FIG. 4 shows the close engagement of the blade inserts 32 and 34 and 36 and 38.

The shear 10 includes a piercing tip 40 at a forward portion of the movable blade 18 such that the blade inserts 30, 32 and 34 are positioned between the piercing tip 40 and the thrust bearing arrangement 20. The piercing tip 40 is removably attached to the movable blade 18 and extends to the blade insert 34. As shown in FIGS. 1 and 2, the piercing tip 40 is positioned below the exposed cutting edges of blade inserts 32 and 34. A pair of guide blocks 42 is positioned on opposite sides of the slot 28 where the piercing tip 40 extends through the slot 28. Additionally, wear plates 44 and 46, also called scuff plates, may be attached to the fixed blade 14 for protecting the shear 10. Wear plate 44 extends across the fixed blade 14 adjacent the forwardmost portion of the slot 28, and wear plate 46 extends across the fixed blade 14 in front of a forwardmost portion of the fixed blade 14. Wear plates 44 and 46 are positioned where a significant amount of load and wear can be expected. Additionally, a wear plate 48 is attached to the movable blade 18 behind the piercing tip 40 on a side of the movable blade 18. As with wear plates 44 and 46, wear plate 48 is positioned where significant forces tend to act on the shear 10.

The piercing tip 40 is illustrated in detail in FIGS. 5–7. The piercing tip 40 includes a substantially planar front face 50 extending from a top surface to a bottom surface 52 of the piercing tip 40. The planar front face 50 tapers rearwardly from the bottom surface 52 to the top surface of the piercing tip 40. Additionally, the front face 50 has a projection on a lower side thereof positioned on a centerline of the front face 50 as best shown in FIG. 5. A front cutting edge 54 extends across the side of the front face 50 which is attached to the bottom surface 52. The front cutting edge 54 is positioned in a plane which is substantially perpendicular to the cooperating, exposed cutting edges of the blade inserts 30, 32, 34, 36 and 38.

The front cutting edge 54 is formed of a pair of spaced, collinear, substantially straight end segments adjacent opposite sides of the front face 50. The front cutting edge 54 includes a substantially straight center segment aligned with the projection of the front face 50 and a pair of transition segments on opposite sides of the center segment. Each transition segment extends from the center segment to one of the end segments and is also substantially straight as shown in FIG. 5.

Each side surface 56 and 58 is attached to the bottom surface 52. The attachment of the side surface 58 and the bottom surface 52 forms a side cutting edge 59 which will generally be positioned in the same plane as the cutting edges of blade inserts 30, 32 and 34. The attachment of the side surface 56 and the bottom surface 52 will also form a side cutting edge which is spaced from side cutting edge 59 by the width of the piercing tip 40. Each side surface 56 and 58 is also attached to the front face 50 and the top surface of the piercing tip 40 and extends to and is attached to a rear surface 60. As shown in FIGS. 6 and 7, the rear surface 60 includes a cutout 62 which is adapted to receive a portion of the blade insert 34 therein. As shown in FIG. 7, the rear surface 60 tapers at an angle of approximately 45° from the bottom surface 52 to the top surface of the piercing tip 40. The bottom surface 52 is attached to the rear surface 60 along a substantially straight line such that the center portion of the bottom surface 52 tapers toward the rear surface 60 at an angle of approximately 4°. The taper of the center portion of the bottom surface 52 is present to accommodate the projection on the front face 50 of the piercing tip 40.

The top surface of the piercing tip 40 is formed of a substantially planar top mounting portion 64 and a curved peripheral portion 66 extending from the top mounting portion 64 to the front face 50, rear surface 60 and side surfaces 56 and 58. The curved peripheral portion 66 thereby forms an offset between the top mounting portion 64 and the front face 50, rear surface 60 and side surfaces 56 and 58 as shown in FIGS. 5 and 7. A mounting post 68 is attached to the top surface of the piercing tip 40 in a recess 70 formed in the top mounting portion 64. The mounting post 68 is angled about 15° relative to vertical and is utilized for securing the piercing tip 40 within the movable blade 18.

A significant advantage of the shear 10 of the present invention is found in the unique configuration of the piercing tip 40. The piercing tip 40 is specifically designed to efficiently cut into a workpiece longer than the jaw of the shear 10. The piercing tip 40 is utilized primarily to make a cut along the front cutting edge 54 which is transverse to the cutting edges of the blade inserts 30, 32, 34, 36 and 38. The piercing tip 40 is specifically designed to minimize the load on the shear 10 during such cutting operations and to provide a long-lasting, efficient, replaceable piercing tip. As discussed, the primary cut of the piercing tip 40 will be along the front cutting edge 54, however, secondary cuts by the piercing tip 40 will occur along the side cutting edge 59 between the side surface 58 and the bottom surface 52 and along the side cutting edge between the side surface 56 and the bottom surface 52 as the remaining portion of the work product is sheared or moved back into the jaw of the shear 10.

As shown in FIGS. 1–4, the piercing tip 40 has a width equal to the width of the moveable blade 18. With this configuration, the front cutting edge 54 will make a piercing cut transverse to the cutting edges of blade inserts 30, 32, 34, 36 and 38 as discussed above substantially across the entire width of the slot 28. Additionally, by constructing the piercing tip 40 with the same width of the moveable blade 18, the side cutting edge 59 is positioned in the same plane as the cutting edges of blade inserts 30, 32, 34, 36 and 38 as best illustrated in FIGS. 3 and 4. As discussed above, the piercing tip 40 is positioned below the cutting blade inserts 34 and 32 to better provide the piercing action. Additionally, as best illustrated in FIG. 1, the piercing tip 40 extends back to the cutting blade insert 34. The blade inserts 30, 32 and 34 together with the piercing tip 40 extends substantially continuously from the pivotable thrust bearing arrangement 20 to the leading edge of the moveable blade 18. This arrangement eliminates any unprotected portion along the jaw face of the moveable blade 18 and provides a substantially continuous cutting edge from the front cutting edge 54 of the piercing tip 40 to the end of the cutting edge of cutting blade insert 30 which is adjacent the thrust bearing arrangement 20. The continuous cutting edge extends along the blade inserts 30, 32 and 34 and along substantially the entire lower edge of the side surface 58. Although the present invention provides a substantially continuous cutting edge along the moveable blade 18, the cutting blade 18 maintains the v-shaped arrangement between cutting blades 30, 32 and 34. This design is primarily intended to have the significant amount of cutting to be performed toward the shears' pivotal engagement. The advantages of this configuration are described in my prior U.S. Pat. No. 4,670,983 which is incorporated herein by reference.

The curved peripheral portion 66, extending from the top mounting portion 64, receives the weld and allows for the weld to be in compression to better hold the piercing tip 40 without significantly extending beyond the edge of the moveable blade 18. This, together with post 68, provides a safer configuration. The projection on the front face 50 of the piercing tip 40 improves the cutting action of the piercing tip 40 and will bend the material to push the material to be cut down for shearing at the sides as well as across the front cutting edge 54.

FIG. 8 illustrates a shear 90 according to a second embodiment of the present invention. Shear 90 is substantially the same as shear 10. In shear 90, the piercing tip 40 of shear 10 has been replaced with a modified piercing tip 100. The piercing tip 100 is shown in greater detail in FIGS. 9–11. The piercing tip 100 is similar to piercing tip 40 and is designed to better accommodate shearing of heavy plate products. The piercing tip 100 is the same width as the moveable blade 18 and extends from the leading edge of the moveable blade 18 to the cutting insert 34 to protect the entire jaw face of the moveable blade 18. The piercing tip 100 differs from the piercing tip 40 by including a blunted tip, formed by blunted surface 108, at the front end thereof which better accommodates the cutting of heavy plate products.

The piercing tip 100 includes a substantially planar front face 110 extending from a top surface to the blunted surface 108 of the piercing tip 100. The blunted surface 108 extends from the front face 110 to the bottom surface 112 of the piercing tip 100. The planar front face tapers rearwardly from the blunted surface 108 to the top surface of the piercing tip 100. A main or front cutting edge 114 extends across the lower portion of the front face 110 which is attached to the blunted surface 108. The front cutting edge 114 is positioned on a plane which is substantially perpendicular to the cooperating, exposed cutting edges of the blade inserts 30, 32, 34, 36 and 38. The blunted surface 108 is substantially planar and tapers rearwardly from the front cutting edge 114 to the bottom surface 112. The blunted surface 108 includes a projection on a lower side thereof positioned on a center line of the piercing tip 100 as best shown in FIG. 9. The front edge of the projection on the blunted surface 108 may provide additional cutting, however, the primary purpose is for directing the plate material as discussed above in connection with the projection on piercing tip 40. In view of the projection formed on the lower blunted surface 108, the lower side of the blunted surface 108 is formed of substantially the same geometry as the front cutting edge 54 of piercing tip 40 described above.

The remaining elements of piercing tip 100 are substantially similar to the corresponding elements of the piercing tip 40 described above. Side surfaces 116 and 118 are attached to the bottom surface 112. The attachment of the side surface 118 and the bottom surface 112 forms a side cutting edge 119 which will generally be positioned in the same plane as the cutting edges of the blade inserts 30, 32, 34, 36 and 38. The attachment of the side surface 116 and the bottom surface 112 will also form a side cutting edge which will be spaced from the side cutting edge 119 by the width of the piercing tip 100. Each side surface 116 and 118 are also attached to the front face 110, blunted surface 108 and top surface of the piercing tip 100 as well as extending to and attaching to the rear surface 120. The rear surface 120 includes a cutout 122 adapted to receive a portion of the blade insert 34 therein. The bottom surface 112 is attached to the rear surface 120 along a substantially straight line such that the center portion of the bottom surface 112 tapers toward the rear surface 120. The taper of the center portion of the bottom surface 112 accommodates the projection on the blunted surface 108 of the piercing tip 100.

The top surface of the piercing tip 100 is substantially the same as the top portion of the piercing tip 40 described above including a substantially planar top mounting portion 124, curved peripheral portion 126, mounting post 128 and recess 130.

In operation, the shear 90 with piercing tip 100 operates in the same manner as shear 10 described above. The shear 90 additionally includes the advantage of a substantially continuous cutting edge along the moveable blade 18 as well as the other advantages provided by the configuration of the piercing tip 100.

Figure 12:
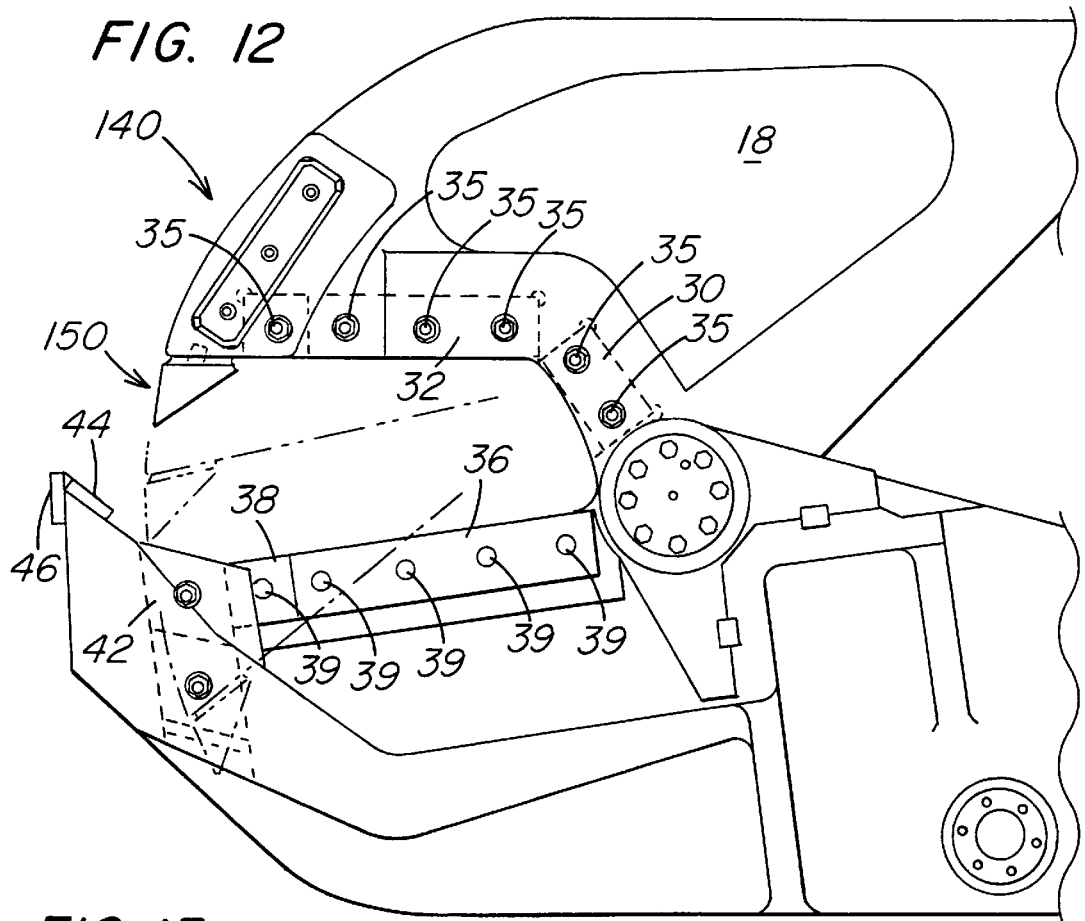
FIG. 12 is a side view of a jaw portion of a shear according to a third embodiment of the present invention.
Figure 13:
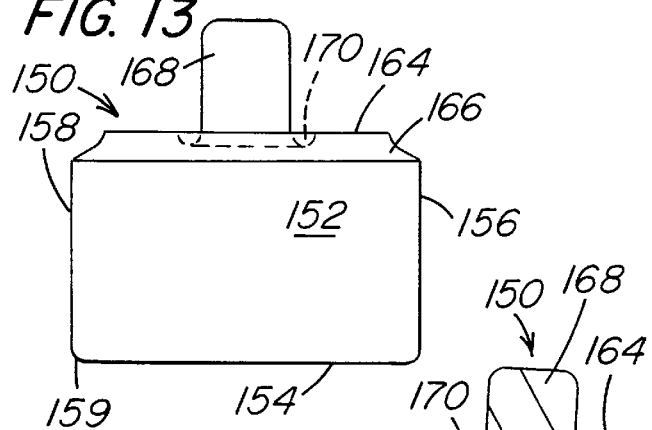
FIG. 13 is a front view of a piercing tip of the shear illustrated in FIG. 12.
Figure 14:
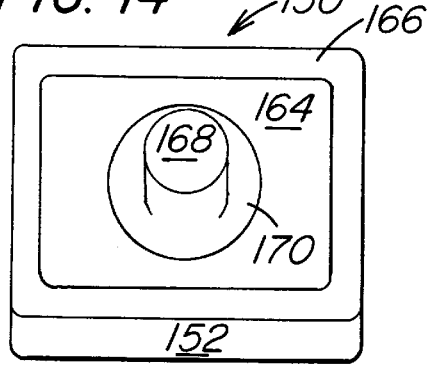
FIG. 14 is a top plan view of the piercing tip illustrated in FIG. 13.
Figure 15:
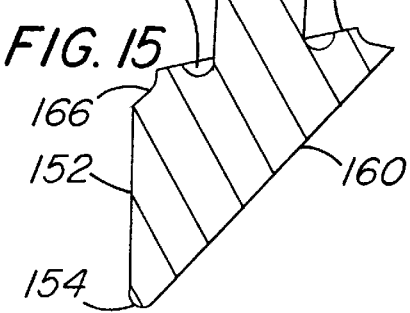
FIG. 15 is a sectional view of the piercing tip illustrated in FIGS. 13 and 14.

FIG. 12 illustrates a modified shear 140 according to a third embodiment of the present invention. The shear 140 is substantially the same as shear 90 and shear 10, described above, except for the provision of a modified piercing tip 150. The piercing tip 150, like the piercing tips 100 and 40, is the same width as the moveable blade 18 and extends to the blade insert 34. As described above in connection with shears 10 and 90, the blade inserts 30, 32 and 34, together with the piercing tip 150, extend substantially continuously from the pivotable attachment of the moveable blade 18 to the distal end of the moveable blade 18 to eliminate any unprotected area of the jaw face. The piercing tip 150 is designed for piercing of lighter gauge material and is specifically designed for drawing this material toward the v-shaped cutting portions of the upper blade 18. The piercing tip 150 essentially serves as a gathering tip for the shear 140. The piercing tip 150 is shown in greater detail in FIGS. 13–15.

The piercing tip 150 includes a substantially planar front face 152 extending from a top surface of the piercing tip 150 to a front cutting edge 154. The front cutting edge 154 is positioned along a bottom side of the front face 152 between side surfaces 156 and 158 and substantially perpendicular to the cooperating, exposed cutting edges of blade inserts 30, 32, 34, 36 and 38 in the same manner as the front cutting edges 114 and 54 of piercing tips 100 and 40, discussed above. The planar front face 152 tapers rearwardly from the front cutting edge 154 to the top surface of the piercing tip 150. A bottom or rear surface 160 extends from the bottom cutting edge 154 to the top surface of the piercing tip 150. Each side surface 156 and 158 extends from the top surface of the piercing tip 150 to the rear surface 160. The attachment of the side surface 158 and the rear surface 160 forms a side cutting edge 159 which will generally be positioned in the same plane as the cutting edges of the blade inserts 30, 32, and 34. Attachment of the side surface 156 and the rear surface 160 will also form a side cutting edge which is spaced from the side cutting edge 159 by the width of the piercing tip 150. The rear surface 160 tapers at a significant angle, approximately 35°, from the front cutting edge 154 to the top surface of the piercing tip 150.

The top surface of the piercing tip 150 is formed substantially the same as the top surface of the piercing tips 100 and 40 described above and includes a substantially planar top surface mounting portion 164, curved peripheral portion 166, mounting posts 168 and recess 170.

Shear 140 operates in substantially the same manner as shears 90 and 10 described above and includes the advantages of having a substantially continuous cutting edge from the pivoting position of the moveable blade 18 to the end of the blade 18, as described above.

FIGS. 16–18 illustrate a further modified piercing tip 200 for use in a shear of the present invention. Only a portion of the upper blade 18 of the shear is shown in FIG. 16. The piercing tip 200 is designed for general type operation and essentially forms a compromise or average between the design of the piercing tip 100 and the design of the piercing tip 150 described above. The piercing tip 200 includes a blunted surface 208 similar to the blunted surface 108 of piercing tip 100. The piercing tip 200 includes a substantially planar front face 210 extending from a top surface to the blunted surface 208 of the piercing tip 200. The planar front face 200 tapers rearwardly from the blunted surface 208 to the top surface of the piercing tip 200. The blunted surface 208 tapers rearwardly from the front face 210 to the bottom surface 212 of the piercing tip 200. A front cutting edge 214 extends across the side of the front face 210 which is attached to the blunted surface 208. The front cutting edge 214 is positioned on a plane which is substantially perpendicular to the exposed cutting edges of the blade inserts 30, 32, 34, 36 and 38 of the shears described above. Each side surface 216 and 218 is attached to the bottom surface 212. The attachment of the side surface 218 and the bottom surface 212 form a side cutting edge which will generally be position in the same plane as the cutting edges of the blade 30, 32, 34, 36 and 38 of the shears, as described above. The attachment of the side surface 216 and the bottom surface 212 will also form a side cutting edge which is spaced from the opposed side cutting edge by the width of the piercing tip 200. Each side surface 216 and 218 are also attached to the front face 210 and the top surface of the piercing tip 200 and extend to and are attached to the rear surface 220. The top surface of the piercing tip 200 is formed substantially the same as the top surface of the piercing tips 40, 100 and 150, described above, and includes a substantially planar top surface mounting portion 224, a curved peripheral portion 226, mounting post 228 and recess 230. The bottom surface 212 tapers rearwardly at an angle approximately 14° from the blunted surface 208 to the rear surface 220. This angle is effectively chosen to be between the angles associated with analogous elements of the piercing tips 100 and 150, described above. This construction allows for the piercing tip 200 to be effective for general, all-purpose use.

The piercing tip 200 is not illustrated in FIGS. 16–18 as including a projection on the blunted surface 208 as described above in connection with piercing tip 100, or the projection on the front face 50 in connection with piercing tip 40. However, this structure is added in the piercing tip 200' shown in FIGS. 19 and 20. The projection is added on the lower side of the blunted surface 208' and results in a modification of the bottom surface 212' as shown. The piercing tip 200' also serves as a general purpose type of piercing tip. Analogously, the piercing tip 150, described above, can also be formed with a projection on a lower surface thereof, if desired, to improve the piercing characteristics. The piercing tip 150 may also be blunted, if desired, to accommodate heavier workpieces. The unique configuration of the piercing tips 40, 100, 150, 200 and 200' will provide improved piercing efficiency and operation for the shears of the present invention. A wide variety of piercing tip designs can be utilized with the shear according to the present invention. The piercing tips 40, 100, 150, 200 and 200' are replaceably attached to the moveable blade 18 of the shears 10, 90 and 140 as discussed above. This allows the specific piercing tip to be selected for the shear in accordance with the primary type of scrap product to be sheared. A plurality of distinct types of piercing tips may be associated with a single shear to increase the versatility of the specific shear. It is not intended that the piercing tip be switched from one piece of scrap product to the next. More likely is that the specific piercing tip can be selected for a particular work site or job.

It will be apparent to those of ordinary skill in the art that various changes may be made to the present invention without departing from the spirit and scope thereof. Consequently, the present invention is intended to be defined by the appended claims.

What is claimed is:

1. A heavy-duty shear adapted to be attached to a backhoe, said shear comprising:
    a fixed blade member;
    at least one blade insert attached to said fixed blade member, said blade insert having at least one cutting edge thereon;
    a movable blade pivotally attached to said fixed blade member at a pivotable attachment;
    at least one blade insert attached to said movable blade, said blade insert having at least one cutting edge thereon, wherein said cutting edge of said blade insert on said movable blade cooperate with said cutting edge of said blade insert of said fixed blade member to provide a shearing action; and
    a piercing tip attached to said movable blade at a position spaced from said pivotable attachment with said blade insert of said movable blade therebetween, wherein said piercing tip extends to said blade insert of said movable blade, and wherein said piercing tip includes:
        a top surface at an upper end of said piercing tip;
        a front face attached to said top surface;
        a pair of side surfaces attached to said top surface on opposite sides of said front face; and
        a rear surface attached to said top surface extending between said pair of side surfaces, wherein said rear surface includes a cutout adjacent said top surface and one of said side surfaces, wherein said cutout receives said blade insert which is attached to said movable blade.

2. A heavy duty shear adapted to be attached to a backhoe, said shear comprising:
    a fixed blade member;
    at least one blade insert attached to said fixed blade member, said blade insert having at least one cutting edge thereon;
    a movable blade pivotally attached to said fixed blade member at a pivotable attachment;
    at least one blade insert attached to said movable blade, said blade insert having at least one cutting edge thereon, wherein said cutting edge of said blade insert on said movable blade cooperate with said cutting edge of said blade insert of said fixed blade member to provide a shearing action; and
    a piercing tip attached to said movable blade at a position spaced from said pivotable attachment with said blade insert of said movable blade therebetween, wherein said piercing tip is welded to said movable blade by a weld, and said piercing tip includes a top surface having a substantially top planar portion and a curved peripheral portion extending from said top planar portion to a front face, a rear surface and side surfaces of said piercing tip, wherein said curved peripheral portion forms an offset between said top planar portion and said front face, said rear surface and said side surfaces to receive said weld.

3. A heavy-duty shear adapted to be attached to a backhoe, said shear comprising:
    a fixed blade member;
    at least one blade insert attached to said fixed blade member, said at least one blade insert having at least one cutting edge thereon;
    a movable blade pivotally attached to said fixed blade member at a pivotable attachment;
    at least one blade insert attached to said movable blade, said at least one blade insert having at least one cutting edge thereon, wherein said cutting edge of said blade insert on said movable blade cooperate with said cutting edge of said blade insert of said fixed blade member to provide a shearing action; and a piercing tip attached to said movable blade at a position spaced from said pivotable attachment with said blade insert of said movable blade therebetween, wherein said piercing tip extends to said blade insert of said movable blade, wherein said piercing tip includes a top mounting surface and a post member attached to said top mounting surface positioned along a longitudinal center plane of said piercing tip.

4. The shear of claim 3 wherein said piercing tip and said blade insert of said movable blade extend substantially continuously to said pivotable attachment.

5. The shear of claim 3 wherein a width of said piercing tip is equal to a width of said movable blade.

6. The shear of claim 3 wherein said piercing tip includes a main cutting edge extending across a front face of said piercing tip substantially perpendicular to said cutting edge of said blade insert of said movable blade, and said piercing tip including at least one side cutting edge extending in a plane of said cutting edge of said blade insert of said movable blade.

7. The shear of claim 6 wherein said cutting edge of said blade insert of said movable blade and said at least one side cutting edge of said piercing tip combine to extend from said pivotable attachment to a distal end of said movable blade.

8. The shear of claim 3 wherein said piercing tip includes a front end having a surface with a projection on a lower side of said surface of said front end on a centerline of said piercing tip.

9. The shear of claim 8 wherein said front end includes a front face which is substantially planar and tapers rearwardly from a lower side of said front face.

10. The shear of claim 9 wherein said front face is said surface of said front end having said projection and a front cutting edge extending across a lower side of said front face.

11. The shear of claim 9 wherein said surface of said front end having said projection is formed by a blunted surface extending rearwardly from said front face to said projection.

12. The shear of claim 1 further including a plurality of distinct piercing tips provided for selective attachment to said movable blade, wherein each said piercing tip is removably attached to said movable blade.

13. The shear of claim 3 wherein said at least one blade insert of said movable blade comprises a plurality of blade inserts arranged in a v-shaped pattern.

14. A removable piercing tip for a heavy duty shear comprising:

a front end having a projection on one side thereof positioned on a centerline of said front end, said front end including a substantially planar front face;

a front cutting edge extending across a lower side of said front face;

a bottom surface adjacent said front end;

a pair of side surfaces spaced from each other, each said side surface adjacent said bottom surface and extending from said front face;

a top surface spaced from said bottom surface, wherein said front face tapers rearwardly from said front cutting edge to said top surface; and a mounting member attached to said top surface, wherein said mounting member includes a post member positioned along a longitudinal center plane of said piercing tip.

15. The piercing tip of claim 14 wherein said bottom surface attaches to a rear surface of said piercing tip along a straight line and wherein at least a middle portion of said bottom surface tapers toward said rear surface from said projection of said front end.

16. The piercing tip of claim 14 wherein said front end includes a blunted surface extending rearwardly from said front cutting edge to said bottom surface, said blunted surface including said projection on a lower side thereof.

17. A piercing tip comprising:

a front end having a projection on one side thereof positioned on a centerline of said front end, said front end including a substantially planar front face;

a front cutting edge extending across a lower side of said front face;

a bottom surface adjacent said front end;

a pair of side surfaces spaced from each other, each said side surface adjacent said bottom surface and extending from said front face; and a top surface spaced from said bottom surface, and further including a rear surface adjacent said bottom surface and spaced from said front end, wherein said rear surface includes a cutout adjacent said top surface and one of said side surfaces.

18. A removable piercing tip for a heavy-duty shear, said tip including:

a mounting top surface;

a mounting member extending away from said top surface in a first direction for removably mounting said tip to the shear;

a bottom surface spaced from said mounting surface; and a front end extending between said bottom surface and said mounting surface wherein said intersection of said bottom surface and said front end forms a raised center portion on said bottom surface which decreases in height in a direction extending away from said intersection of said bottom surface and said front end.

19. The removable piercing tip of claim 18 wherein said mounting member includes a post member positioned along the center plane of said piercing tip.

20. The removable piercing tip of claim 19 wherein said piercing tip is adapted to be welded to a shear by a weld and said mounting top surface includes a substantially top planar portion and a curved peripheral portion extending from said top planar portion to said front end, a rear surface and side surfaces of said piercing tip, wherein said curved peripheral portion forms an offset between said top planar portion and said front end, said rear surface and said side surfaces to receive said weld.

* * * * *

UNITED STATES PATENT AND TRADEMARK OFFICE
CERTIFICATE OF CORRECTION

PATENT NO. : 5,926,958
DATED      : July 27, 1999
INVENTOR(S): John R. Ramun

It is certified that error appears in the above-identified patent and that said Letters Patent is hereby corrected as shown below:

Column 10 Line 13 Claim 1 "cooperate" should read --cooperates--.

Column 10 Line 43 Claim 2 "cooperate" should read --cooperates--.

Column 11 Line 2 Claim 3 "cooperate" should read --cooperates--.

Column 11 Line 42 Claim 12 "of claim 1" should read --of claim 3--.

Signed and Sealed this

First Day of February, 2000

Attest:

Q. TODD DICKINSON

Attesting Officer

Acting Commissioner of Patents and Trademarks